United States Patent [19]

Kaiser

[11] 3,976,577
[45] Aug. 24, 1976

[54] FILTER UNIT WITH PROTECTED VALVE CONTROLLERS

[75] Inventor: Danny K. Kaiser, Three Rivers, Mich.

[73] Assignee: Dover Corporation, Portage, Mich.

[22] Filed: Dec. 16, 1974

[21] Appl. No.: 532,952

[52] U.S. Cl. .............................. 210/333 R; 210/340
[51] Int. Cl.² .......................................... B01D 23/38
[58] Field of Search ................ 210/299, 323 T, 333, 210/340

[56] References Cited
UNITED STATES PATENTS

| | | | |
|---|---|---|---|
| 211,640 | 1/1879 | Peterson | 210/340 |
| 767,808 | 8/1904 | Forbes | 210/249 |
| 2,434,427 | 1/1948 | Muller | 210/340 X |
| 2,454,124 | 11/1948 | Birsch et al. | 210/340 X |
| 2,828,017 | 3/1958 | Ronningen et al. | 210/333 X |
| 3,193,100 | 7/1965 | Broughton | 210/333 X |
| 3,445,002 | 5/1969 | Muller | 210/333 X |

Primary Examiner—Charles N. Hart
Assistant Examiner—Robert H. Spitzer
Attorney, Agent, or Firm—Woodhams, Blanchard and Flynn

[57] ABSTRACT

Filter assembly, particularly for handling liquids at elevated temperatures. There is disclosed a filter assembly wherein the headers supplying filter liquid to the filter units and receiving filtrate therefrom are arranged in a first zone, all the filter units are arranged in a second zone, and at least some of the actuators for the backwash controlling valves extend outwardly of and away from both of said zones to avoid the heat associated with said zones. A heat shield may then be positioned between said valve actuators and the rest of the filter assembly, which heat shield may, if desired, be one wall of a heat retaining box enclosing the headers and filter cylinders.

13 Claims, 6 Drawing Figures

FILTER UNIT WITH PROTECTED VALVE CONTROLLERS

FIELD OF THE INVENTION

The invention relates to a backwashing control for a gang of filters, and particularly to a control especially adapted for use with filters handling liquids at elevated temperatures wherein said control is removed from the zone of elevated temperatures.

BACKGROUND OF THE INVENTION

In the filtering of various types of liquids in chemical plants, pulp mills, refineries or similar plants, it is common to use a filtering system involving a plurality of individual filter units positioned close together and provided with automatic control means for effecting backwashing. In the course of normal operation of said backwashing control means, same often becomes for one reason or another progressively less efficient, or may even suffer complete breakdown, and when this happens the filter unit to which such control means is connected fails to backwash properly. Where the filter is one of a group thereof, such breakdown is often not noticed immediately and the improper operation may continue for a substantial period of time before discovery.

One particular example of such problem occurs where the filters are handling liquid at an elevated temperature, often of the order of 400°–550°F. in frequently encountered refinery usages, and hence the filter housings and conduits associated therewith are heated to such levels and radiate heat accordingly. In presently standard constructions, the backwash controlling valves and actuators therefor are positioned closely adjacent, often between, the filter unit components, such as between the filter housings and the associated conduits, and are accordingly subjected to such radiated heat. Where, as is usual, the actuators are pneumatic, they utilize pistons with sealing means therein which sealing means are elastomeric and usually subject to rapid deterioration when subjected to temperatures as above mentioned, especially for prolonged periods. Thus, under normal operating conditions of such filters, these seals may, and often do, rapidly deteriorate. This may in some circumstances result merely in the loss of power needed to fully shift the valve but in other cases it can result in binding of the actuator piston and a consequent complete failure to effect backwashing. In such cases, even though the replacement of a piston seal, usually a simple O-ring, is of itself a relatively minor and inexpensive job, the heat to which the filters and conduits are subjected as above stated requires substantial cooling of the unit before a workman can under existing safety regulations approach same for repair and/or replacement of the defective mechanism. Since it may often take from 8 to 10 hours for the filter and system to which it is connected to cool sufficiently to permit such access by workmen, it is apparent that a relatively minor repair job can keep the filters and thereby often an entire processing line inactive for a considerable period of time. This is obviously costly and it has long been recognized as a disadvantage of the equipment available up to the present.

In certain types of otherwise highly satisfactory equipment the problem has been particularly acute in that the filter units are placed in at least two rows, each row being on opposite sides of a central header and the valves being directly above and/or below such central header. Such positioning of the valves places the controllers between and somewhat behind the filter units and this, while operationally convenient, makes same difficult of access for repair and/or replacement regardless of temperature considerations. However, when the equipment is hot as above outlined, such access becomes even more difficult and the cooling above mentioned must be substantial.

The problem is further intensified where a heat retaining box is placed around the filter unit but such box is nevertheless often used for heat conservation reasons.

Thus, since the filters are necessary to the systems in which they are used and no solution was known to the problem of actuator repair as above described, said problem and the difficulties arising therefrom have been tolerated.

Some attempts have been made to obtain the benefits of such heat retaining box without the damage above mentioned arising from overheating of the actuators by wrapping insulative material around the conduits and valves and, if desired, even around the filter units but leaving the actuators projecting therefrom. This works reasonably well and is hence often used in place of the heat retaining box. This, however, generates substantial expense in both the original application of said insulative material and in the maintenance thereof. Further, where such insulative wrapping is used it renders all parts difficult of access and hence creates further expense in the proper maintenance of the equipment.

Other attempts to meet this problem have involved wrapping the actuators with insulative material in order to protect them from the heat of the adjacent filters and conduits, particularly if said latter remain unwrapped. This, however, is likewise undesirable for the same reasons as above set forth, namely expense of wrapping, inconvenience and expense in maintenance, said latter particularly including the inconvenience and expense of obtaining access to the actuators for repair or maintenance thereof.

A still further suggestion for meeting the foregoing outlined problems has been to replace the normally used actuators by other control devices which would be capable of withstanding high temperature operating conditions. However, this is often not economically desirable or commercially available. Instead the normally used actuators are inexpensive and, excepting for the problems created by high temperature operating conditions as above outlined, are reliable in operation and simple to repair when needed.

Therefore, again, in spite of the problems above-described, the necessity of the filters in question to numerous industrial systems has impelled the continued use of such actuators and for lack of apparent solution said problems and resulting difficulties have been tolerated for several years.

Accordingly, the major objects of the invention include:

1. To provide an organizational pattern for a filter assembly which will maintain the effectiveness of currently known filter assemblies but which will permit the actuators for the backwash controlling valves to be placed in an accessible position for service and/or replacement regardless of whether the filter unit operates at an elevated temperature and regardless of the cause of the need for such service and/or replacement.

2. To provide apparatus, as aforesaid, in which, where the filter operates at an elevated temperature, the placement of said valve actuators can be outside of the heated zone surrounding the filter unit and the associated conduits.

3. To provide apparatus, as aforesaid, wherein such improved accessibility of the valves will not involve extended or complex mechanical linkage between the actuator and the valve.

4. To provide apparatus, as aforesaid, which will be particularly adaptable to the use of air energized valve actuators.

5. To provide apparatus, as aforesaid, which will not materially, if at all, increase the manufacturing cost of a filter assembly over that previously experienced.

Other objects and purposes of the invention will be apparent to persons acquainted with apparatus of this general type upon reading the following specification and inspecting the accompanying drawings.

SUMMARY OF THE INVENTION

Figure 2:
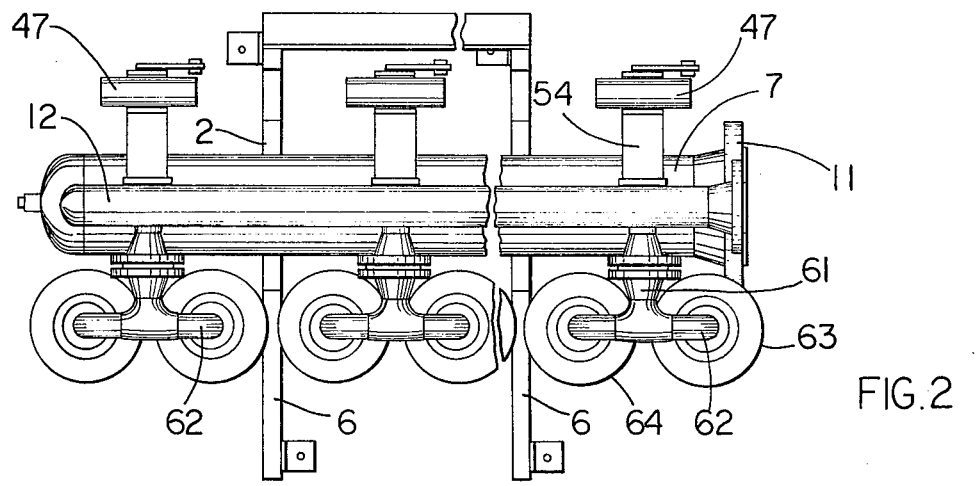
FIG. 2 is a top view of the apparatus shown in FIG. 1.

By rearranging the filter units and placing all of same generally in one zone with respect to the headers from which they are supplied and into which they discharge, it becomes possible to offset all of the valve controllers into a different zone with respect to the headers and to operate same effectively without extensive mechanical linkage. Thus, the wall of a heat retaining box may be positioned adjacent said headers which box may then encompass said headers and the filter units but the actuators are outside of said box and shielded from the heat therewithin. Accordingly, there is less deterioration of the seals utilized in said actuators and by the same token same can be inspected more readily and removed for repair and/or replacement more readily.

DETAILED DESCRIPTION

Turning now to the drawings in more detail for one specific embodiment of this concept, there is shown a supporting frame structure 1 comprising a plurality of uprights 2 connected by at least one longitudinal member 3. Suitable brace members are provided for the better support of the filter assembly, if desired, in any manner convenient, such as those shown at 6. Additional or alternate frame structure may be provided as desired. Extending longitudinally and centrally through the filter assembly is a conduit 7, usually the inlet conduit, provided with the usual flange means 8 for connecting to supply means and directly thereabove is an outlet conduit 9 extending similarly through the assembly and provided with suitable means as the flange 11 for connecting to a filtrate receiving system.

Assuming for the present that the backwashing operation is to take place with a liquid other than the filtrate, there is provided a backwash supply conduit 12 parallel with and spaced above the outlet conduit 9.

A drain (backwash disposal) conduit 13 is provided adjacent the bottom of the assembly spaced from, below and parallel with the inlet conduit 7.

A short pipe 16 connects the backwash supply conduit 12 through an on-off valve 17 to a further short pipe 18 which is connected through a T-connection 19, hereinafter further referred to, and thence a short pipe 21 and a further on-off valve 22 to and into the outlet conduit 9.

Figure 4:
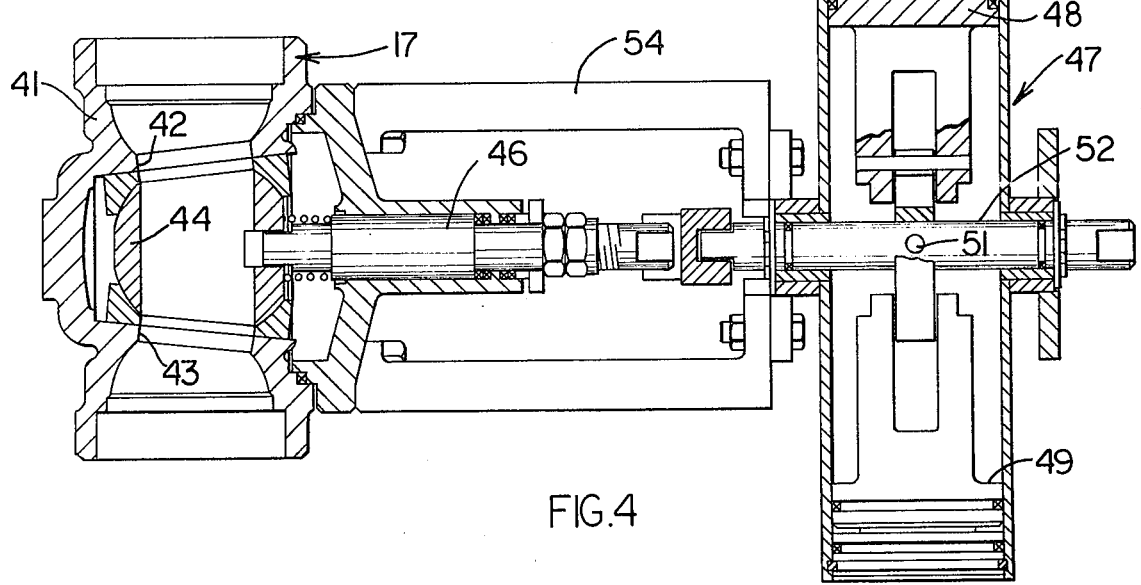
FIG. 4 is a central section of a valve and actuator unit showing the details of a conventional valve and valve controlling unit utilized in the assembly of the invention.

Similarly, a short pipe 31 connects the drain conduit 13 through an on-off valve 32 and the further short pipe 33 to a T-connection 34 (hereinafter further mentioned). Said T-connection is then connected through another short pipe 36 and an on-off valve 37 to and into the inlet conduit 7. Each of said valves 32, 37, 17 and 22 is conventional and one preferred form is shown in FIG. 4. Assuming same for example to be the valve 17, there is shown a valve body 41 containing the conventional ports 42 and 43 and a valve core 44 rotatable for on-off positioning in a conventional manner by a rotatable stem 46.

Connected to said stem 46 is a conventional valve actuator 47 which in this embodiment is of an air-energized type. In such embodiment a pair of oppositely directed, but suitably cooperating, pistons 48 and 49 are connected to opposite ends of a pin 51 which pin extends through an actuator stem 52. Movement of said pistons toward said stem act on opposite ends of the pin 51 to effect rotation of the stem 52 and thereby, in a manner already known, to effect rotation of the valve stem 46 to position the valve core as desired. The return for said pistons may be conventional, as by reversal of the air pressure or by resilient means as desired.

It will be recognized that the effective operation of said actuator is dependent upon the effectiveness of the sealing of the piston therein, which is in turn dependent on the effectiveness of resilient O-rings of which one is indicated at 53. It is the often accelerated, and frequently erratic and unpredictable, breakdown of these O-rings when the actuator is operated under high temperature conditions that brings about the erratic and unsatisfactory operation of the devices of the prior art.

A protective casing 54, usually mounted as shown here on the cover of the valve housing, is normally provided for protecting the valve stem, the actuator stem and the connection therebetween.

All of the foregoing, except the exact positioning of the valve actuators, is conventional, well known to the art and forms no part of the present invention.

Figure 1:
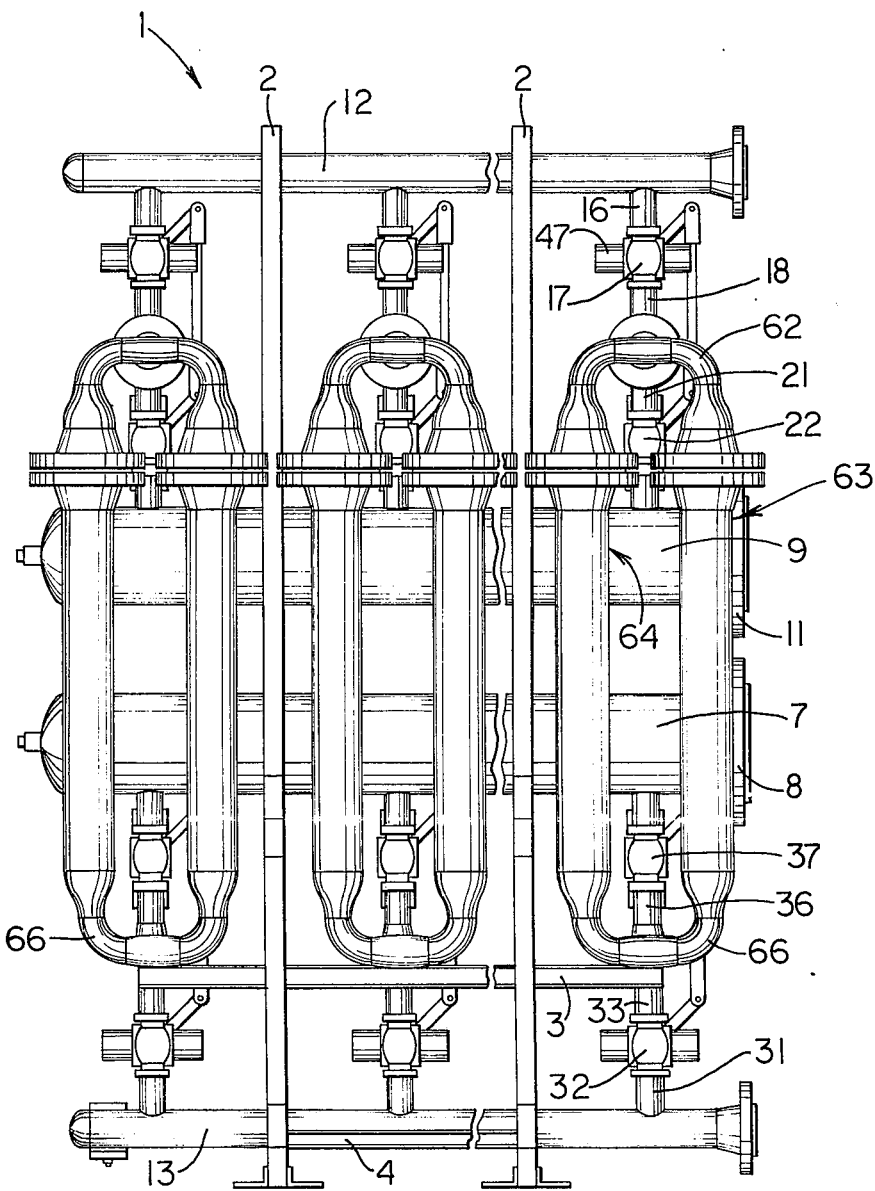
FIG. 1 is a side broken view of a filter assembly embodying the invention.
Figure 3:
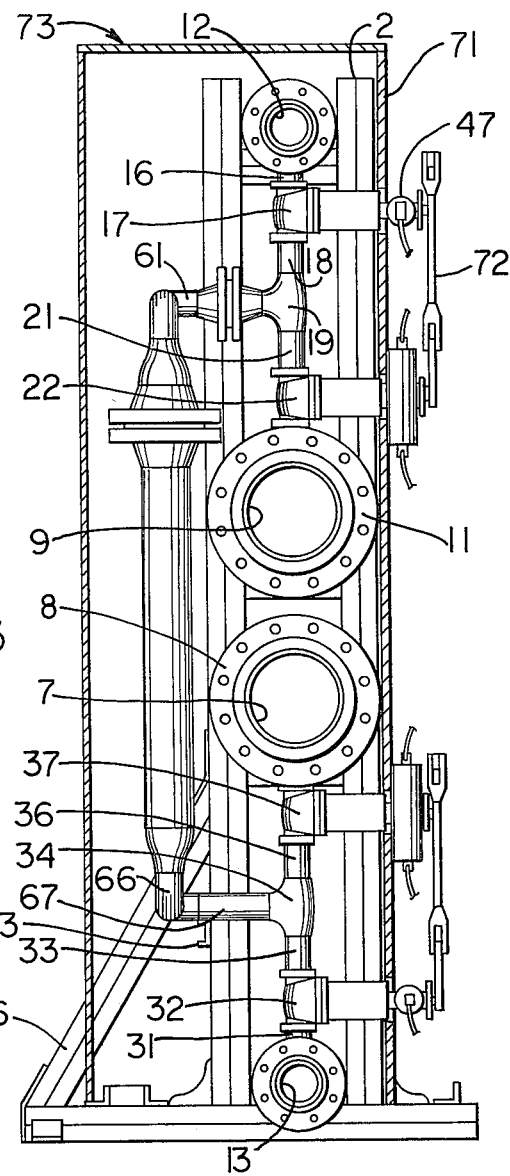
FIG. 3 is an end view of the apparatus shown in FIG. 1, showing also in section a heat retaining box which is in some instances placed around said filter unit.

Turning now to the means by which the above-described problems have been satisfactorily solved, there is in this embodiment provided from the T-connection 19 a conduit 61 extending therefrom in one direction only and same connects to a header 62 (FIG. 1). Said header connects at each end to the upper end of a pair of filter units 63 and 64 which are mounted side-by-side and on the same side of the conduits 7 and 9. The lower ends of said filter units 63 and 64 connect through a further header 66 to a connector 67 which in turn connects to the T-connection 34.

Returning now to the valves 17, 22, 37 and 32, same are here positioned so that their respective stems are perpendicular to the plane defined by the longitudinal centerlines of the conduits 12, 7, 9 and 13. Said valve stems, actuator stems and the protective housing 54 are all chosen of sufficient length to extend beyond a plane defined by the common tangent to the surfaces of the conduits 7 and 9 remote from the above-mentioned filters.

Thus, the placement of the pairs of filters on one side of the conduits 7 and 9 makes it possible for the valve stems to project directly to the other side thereof and to be easily accessible. Thus, a protective wall 71 may be positioned between the actuator 47 and the remaining components of the filter system for heat control purposes as above described, but without subjecting said actuators to such heat or without inhibiting their accessibility for repair or replacement. Normally, such wall 71 will be part of a heat retention box 73 surrounding the entire filter device.

Connectors such as the one indicated at 72 may be provided between the valve actuators in a conventional manner to insure simultaneous operation of respective pairs of valves, such as the valves 17 and 22.

Although the foregoing description has been directed toward the filter unit 63 and 64 and the conduits, valves and valve actuators directly associated therewith, it will be recognized that each of the other filter units shown, together with their respective connections, valves and valve actuators, will be identical to the components above-described and hence no individual description of these further units is required. It will be further recognized that a given filter assembly may be provided with as many pairs of filters and their respective connections, valves and valve actuators as desired for given installations.

If it is desired in a given case to dispense with the heat retaining box 71 and to use instead insulative wrapping for the several conduits and connections which are provided for a given filter assembly, the filter units and their respective valve actuators may still be advantageously arranged as shown without interfering with the operation, inspection, repair and/or replacement of any of the valve actuators used therewith.

It will be further recognized that where it is acceptable to use the filtrate for the backwash material, the conduit 12, valve 17 and connecting pieces immediately associated therewith will be discarded (or alternatively, the valve 17 positioned in a permanently closed position) and the backwash effected in a known manner by pressurizing the outlet conduit 9 and reversing the valves 32 and 37.

Figure 5:
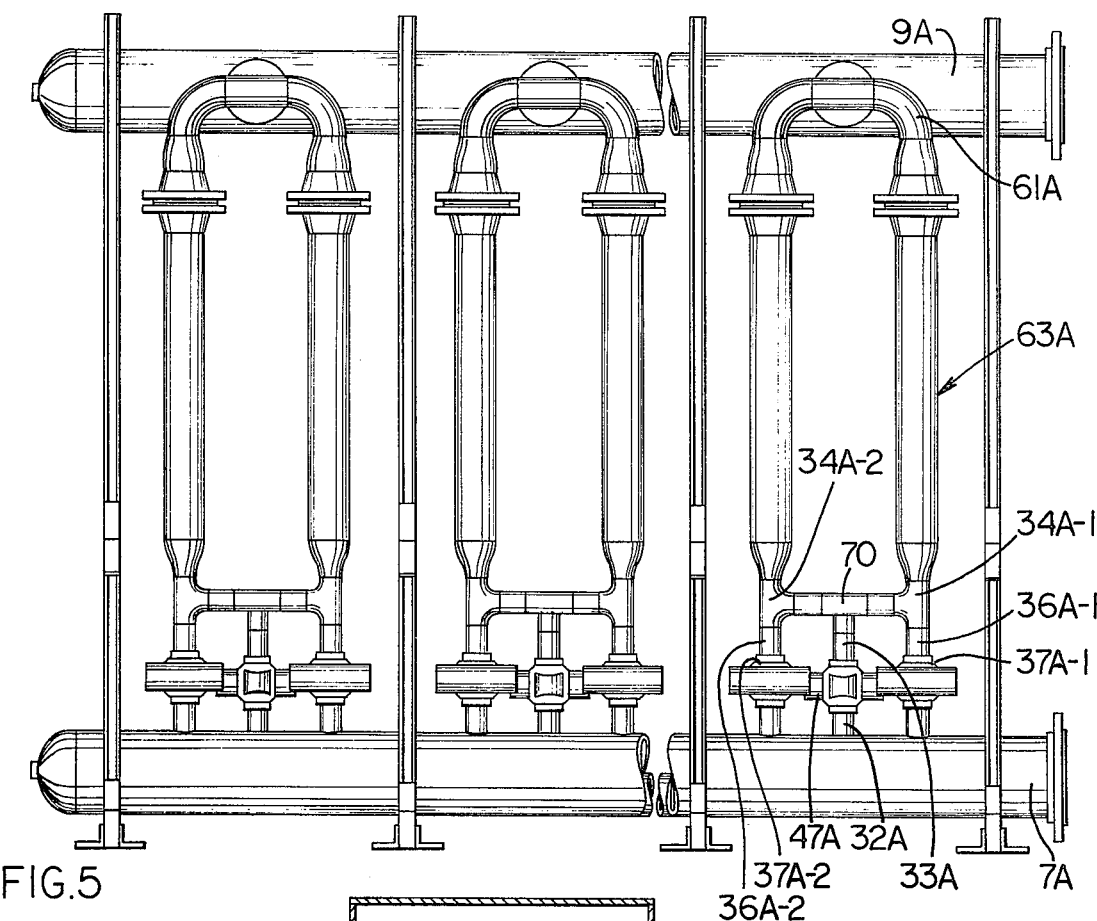
FIG. 5 is a broken side view of a different filter construction embodying the invention with the heat retaining box removed.
Figure 6:
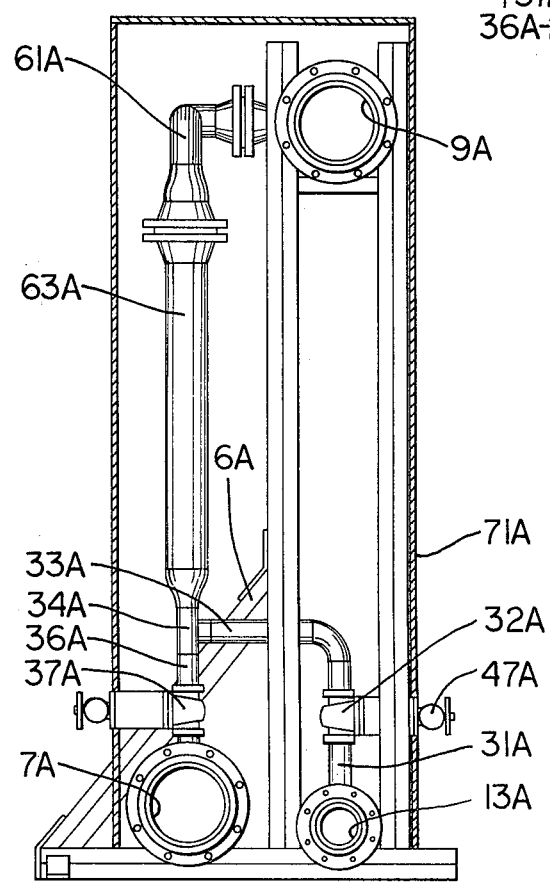
FIG. 6 is an end view of the apparatus shown in FIG. 5 showing also in section the location of the heat retaining box if and when same is used.

In FIGS. 5 and 6 there is illustrated a somewhat modified filter construction which still embodies the substance of the present invention although with a somewhat different arrangement of the specific parts thereof. The parts of the filter which are the same or functionally the same as those appearing in FIGS. 1-4 are identified with the same numerals as appearing in FIGS. 1-4 with the letter "A" associated therewith. The description given above with respect to FIGS. 1-4 will for the most part apply also to FIGS. 5 and 6 and does not need to be repeated. However, it should be here noted that this filter is intended to utilize the discharge therefrom for backwashing and hence there is no conduit shown herein corresponding to the conduit 12 in FIGS. 1-4 but same could be added, if desired, in the same manner as in FIGS. 1-4 without departure from the scope of the invention. Further, it will be noted that in FIGS. 5 and 6, the single valve 37 between a filter pair and the inlet conduit 7 of FIGS. 1-4 is represented in FIGS. 5 and 6 by two independent valves 37A-1 and 37A-2 which normally function simultaneously with each other in the same manner as valve 37 above mentioned but which provide for enlarging the capacity of the connection between the inlet conduit 7A and the filters without the necessity for larger and hence more expensive piping. It will be noted, however, that the valve 32A is serially connected to valves 37A-1 and 37A-2 between the inlet conduit 7A and the drain conduit 13A by means of the conduit 33A, fitting 70 T-connections 34A-1 and 34A-2, and conduits 36A-1 and 36A-2. This corresponds to the serial connection of the valves 37 and 32 above-described and the filters in FIGS. 5 and 6 are connected to a point between said valves in functionally the same manner as the filters in the embodiment of FIGS. 1-4.

It will be further noted that in FIGS. 1-4 the conduits occupy a first zone which is of essentially vertically oriented and rectangular shape, with the filters occupying a second generally rectangular, vertically oriented, zone on one side thereof and the valve actuators occupy a third vertically oriented, generally rectangular, zone on the opposite side thereof. Constrastingly, in FIGS. 5 and 6 the conduits occupy a generally L-shaped first zone, the filters occupy a vertically oriented, generally rectangular, second zone in the notch of but spaced from the L-zone and the actuators occupy two separate zones on either side of and sufficiently spaced from both said first and second zones to enable a heat shield 71A or heat retaining wall to be positioned between said actuators and the adjacent one of both said first and second zones.

It will be recognized by extension of the foregoing that a variety of further specific arrangements of the filters and conduits can be provided in addition to those shown herein which will incorporate at least some of the concepts and resulting advantages of the present invention. For example, said conduits, or some of them, may be placed in a nonparallel relationship with respect to one or more of the other conduits but still having the centerlines lie within a single vertical plane, or other identifiable zone, in the manner shown in the present drawings.

Further possible arrangements involve positioning one or more of said conduits in other specific patterns with respect to each other but still within a sufficiently cohesive zone, and a zone distinguishable and spaced from that occupied by the filters, that the actuators can project out therefrom and away from both said zones without the necessity of using excessively long connecting means with consequent high engineering and maintenance costs.

Thus, while specific embodiments of the invention have been shown and/or described for illustrative purposes, it will be recognized that other modifications may be made therein without departure from the scope of the hereinafter appended claims and said modifications are fully contemplated excepting as the claims may expressly require otherwise.

The embodiments of the invention in which an exclusive property or privilege is claimed are defined as follows:

1. A filter assembly for installation into a closed pressurized system and which is capable of handling fluids at elevated temperatures, comprising:

an inlet conduit, an outlet conduit and a drain conduit, said conduits extending substantially in a common direction, said conduits being contained in a first zone;

a plurality of substantially side-by-side filter units distributed along said conduits and all contained in a second zone, said filter units having inlets and outlets;

a group of first valves distributed along said conduits and a group of second valves also distributed along said conduits;

first conduit means each including a said first valve and a said second valve connected in series therein and connecting said inlet conduit to said drain conduit, second conduit means connecting the inlets of said filter units to said first conduit means between said group of first valves and said group of second valves, and third conduit means connecting the outlets of said filter units to the outlet conduit, said first and second zones and said valves and said conduit means all being contained in a common zone, and a plurality of valve actuators opposed to said valves, all said valve actuators being spaced outwardly of and away from said common zone, thereby positioning said valve acutators out of heat within said common zone and also rendering said valve actuators readily accessible for inspection, service and/or replacement;

means operatively connecting said actuators to said valves and extending into said common zone from said actuators; and heat insulating means separating said actuators from said conduits, filter units and conduit means.

2. The device of claim 1, wherein the centerlines of at least two of said conduits lie in a generally vertical plane, all of said filter units being to one side of said plane and at least some of said actuators being on the other side of said plane.

3. The device of claim 1 wherein all of said actuators lie in a single and third zone spaced from said first zone in a direction opposite to said second zone.

4. The device of claim 1 wherein said actuators for the valves of at least one said group lie in a single and third zone spaced from said first zone in a direction opposite to said second zone.

5. The device of claim 1 wherein at least one of said conduits is offset horizontally from a vertical plane through the center of at least one other of said conduits but all of said conduits are still encompassed within said first zone.

6. The device of claim 1 wherein said inlet conduit is positioned directly below said filter units and said outlet conduit and said drain conduit are positioned to one side thereof and generally one above the other to define with said inlet conduit a generally L-shaped first zone and wherein the actuators connected with the ones of said valves connected to said inlet conduit extend in one direction from and out from said first zone and the actuators associated with the ones of said valves connected to said drain conduit extend from and out from said first zone in the opposite direction.

7. The device of claim 1 in which said common zone extends longitudinally of said conduits and is of rectangular transverse cross section, said filter units being adjacent one side of said rectangular cross section common zone and at least some of said conduits being adjacent the other side, the portions of said conduit means containing said valves extending substantially parallel to the sides of said rectangular cross section common zone, said conduit means portions and valves therein each being spaced inward from but having an unobstructed view of the adjacent side of said rectangular cross section common zone, said valves and actuators being distributed along said conduits and thus along the length of said common zone such that each actuator is sidewardly offset from a corresponding set of at least one filter unit to be controlled thereby.

8. The device of claim 7 in which said operatively connecting means includes a linear member connecting each actuator with a corresponding valve and extending perpendicularly through the nearest said side of said common zone, each actuator being disposed outside said nearest side of said common zone in spaced opposed relation to said actuable portion of the corresponding said valve, the axes of at least a pair of said conduits defining and lying in an intermediate imaginary plane interposed between said sides of said common zone and uniformly spaced from each of said sides of said common zone.

9. A filter assembly capable of handling fluids at elevated temperatures which is adapted for installation into a closed pressurized system and which comprises;

an inlet conduit, an outlet conduit parallel therewith and a drain conduit spaced from and parallel with said inlet and outlet conduits and first connecting means including pairs of spaced, serially connected valves connecting and disposed between said inlet conduit and said drain conduit, said conduits and valves being substantially coplanar;

a plurality of filter units positioned substantially side-by-side, said filter units having inlets and outlets, second connecting means connecting the inlets of said filter units between said serially connected valves and third connecting means connecting the outlets of said filter units to the outlet conduit, said filter units being offset from one side of said conduits and valves;

valve actuators connected operatively to said valves and offset sufficiently from the other side of said conduits and valves as to be separated therefrom by a plane tangent to said other side of said inlet and outlet conduits, wherein said actuators face said valves but are offset away from heat radiation by and concentrated between said conduits and filter units and are readily accessible for inspection, service and/or replacement; and heat insulating means between said actuators and said inlet and outlet conduits.

10. The device claimed in claim 9 including also a backwash conduit spaced from and parallel with said outlet conduit and fourth connecting means including two spaced, serially connected on-off valves connecting said backwash conduit to said outlet conduit, said third connecting means connecting the outlet of said filter units to a point in said fourth connecting means between said two last-named valves, and actuators for said last-named valves and means connecting same to said valves and spaced in a direction from said valves opposite to the spacing from said inlet and outlet conduits of said filter units whereby to render said last-named actuators readily accessible for inspection, servicing and/or replacement.

11. A filter assembly capable of handling fluids at elevated temperatures, which is adapted for installation into a closed pressurized system and which comprises;
an inlet conduit, an outlet conduit parallel therewith and a drain conduit spaced from and parallel with said inlet and outlet conduits and first connecting means including pairs of spaced, serially connected valves connecting and disposed between said inlet conduit and said drain conduit, said conduits and valves being substantially coplanar;
a plurality of filter units positioned substantially side-by-side, said filter units having inlets and outlets, second connecting means connecting the inlets of said filter units between said serially connected valves and third connecting means connecting the outlets of said filter units to the outlet conduit, said filter units being offset from one side of said conduits and valves; and
valve actuators connected operatively to said valves and offset sufficiently fron the other side of said conduits and valves as to be separated therefrom by a plane tangent to said other side of said inlet and outlet conduits, wherein said actuators face said valves but are offset away from heat radiation by and concentrated between said conduits and filter units and are readily accessible for inspection, service and/or replacement; and
a heat shielding wall between said actuators and said inlet and said outlet conduits.

12. A filter assembly for installation into a closed pressurized system and which is capable of handling fluids at elevated temperatures, comprising:
an inlet conduit, an outlet conduit and a drain conduit, said conduits extending substantially in a common direction, said conduits being connected in a first zone;
a plurality of substantially side-by-side filter units distributed along said conduits and all contained in a second zone, said filter units having inlets and outlets;
a group of first valves distributed along said conduits and a group of second valves also distributed along said conduits;
first conduit means each including a said first valve and a said second valve connected in series therein and connecting said inlet conduit to said drain conduit, second conduit means connecting the inlets of said filter units to said first conduit means between said group of first valves and said group of second valves, and third conduit means connecting the outlets of said filter units to the outlet conduit, said first and second zones and said valves and said conduit means all being contained in a common zone;
a plurality of valve actuators opposed to said valves and spaced outwardly of and away from said common zone, thereby positioning said valve actuators out of heat within said common zone and also rendering said valve actuators readily accessible for inspection, service and/or replacement;
means operatively connecting said actuators to said valves and extending into said common zone from said actuators;
a heat shielding wall at least in part bounding said common zone, said actuators being distributed along the outside of said wall and separated from said conduits, filter units, conduit means and valves by said heat shielding wall.

13. A filter assembly for installation into a closed pressurized system and which is capable of handling fluids at elevated temperatures, comprising:
an inlet conduit, an outlet conduit and a drain conduit, said conduits extending substantially in a common direction, said conduits being contained in a first zone;
a plurality of substantially side-by-side filter units distributed along said conduits and all contained in a second zone, said filter units having inlets and outlets;
a group of first valves distributed along said conduits and a group of second valves also distributed along said conduits;
first conduit means each including a said first valve and a said second valve connected in series therein and connecting said inlet conduit to said drain conduit, second conduit means connecting the inlets of said filter units to said first conduit means between said group of first valves and said group of second valves, and third conduit means connecting the outlets of said filter units to the outlet conduit, said first and second zones and said valves and said conduit means all being contained in a common zone;
a plurality of valve actuators opposed to said valves and spaced outwardly of and away from said common zone, thereby positioning said valve actuators out of heat within said common zone and also rendering said valve actuators readily accessible for inspection, service and/or replacement;
means operatively connecting said actuators to said valves and extending into said common zone from said actuators;
said common zone extending longitudinally of said conduits and being of rectangular transverse cross section, said filter units being adjacent one side of said rectangular cross section common zone and at least some of said conduits being adjacent the other side, the portions of said conduit means containing said valves extending substantially parallel to the sides of said rectangular cross section common zone, said conduit means portions and valves therein each being spaced inward from but having an unobstructed view of the adjacent side of said rectangular cross section common zone, said valves and actuators being distributed along said conduits and thus along the length of said common zone such that each actuator is sidewardly offset from a corresponding set of at least one filter unit to be controlled thereby, said operatively connecting means including a linear member connecting each actuator with a corresponding valve and extending perpendicularly through the nearest said side of said common zone, each actuator being disposed outside said nearest side of said common zone in spaced opposed relation to said actuable portion of the corresponding said valve, the axes of at least a pair of said conduits defining and lying in an intermediate imaginary plane interposed between said sides of said common zone and uniformly spaced from each of said sides of said common zone; and
heat shielding walls at and connecting said sides of said common zone and forming a heat retention box enclosing in the common zone said conduits, filter units, conduit means and valves, said actuators being located outside said heat retention box in opposed relation to corresponding said valves to be actuated thereby, said linear members being distributed along and extending through said heat shielding walls for opening and closing said valves without exposing said actuators to heat radiated from elevated temperature fluids passing through the apparatus in said heat retention box.

* * * * *